United States Patent
Wu et al.

(10) Patent No.: US 8,577,814 B1
(45) Date of Patent: Nov. 5, 2013

(54) SYSTEM AND METHOD FOR GENETIC CREATION OF A RULE SET FOR DUPLICATE DETECTION

(75) Inventors: Jianhui Wu, Seattle, WA (US); Srikanth Thirumalai, Clyde Hill, WA (US)

(73) Assignee: Amazon Technologies, Inc., Reno, NV (US)

( * ) Notice: Subject to any disclaimer, the term of this patent is extended or adjusted under 35 U.S.C. 154(b) by 271 days.

(21) Appl. No.: 13/193,285

(22) Filed: Jul. 28, 2011

(51) Int. Cl.
*G06F 15/18* (2006.01)

(52) U.S. Cl.
USPC .................................................. 706/12

(58) Field of Classification Search
None
See application file for complete search history.

(56) References Cited

U.S. PATENT DOCUMENTS

| | | | |
|---|---|---|---|
| 7,765,127 B2 | 7/2010 | Banks et al. | |
| 8,285,721 B2 | 10/2012 | Ruvini et al. | |
| 2003/0126598 A1* | 7/2003 | Agnihotri et al. | 725/32 |

OTHER PUBLICATIONS

Carvalho et al. "Replica Identification using Genetic Programming", SAC, 2008, pp. 1801-1806.*
Schultz et al. "Using a Genetic Algorithm to Learn Behaviors for Autonomous Vehicles", AIAA GNC, 1992, pp. 1-12.*

* cited by examiner

*Primary Examiner* — Li-Wu Chang
(74) *Attorney, Agent, or Firm* — Robert C. Kowert; Meyertons, Hood, Kivlin, Kowert & Goetzel, P.C.

(57) ABSTRACT

Embodiments may generate a population of candidate rules including multiple rule conditions for detecting duplicates, each duplicate representing different sets of item description information that describe a common item. For each candidate rule of the population, embodiments may apply that rule to a reference data set including known duplicates and non-duplicates. Embodiments may assign each candidate rule a fitness score generated with a fitness function based on the performance of that candidate rule. Embodiments may, based on the fitness scores, select a subset of the population of candidate rules as parents for the new generation of candidate rules. Embodiments may perform crossover and/or mutation operations on the parent candidate rules to generate the new generation of candidate rules. Embodiments may select from the new generation of candidate rules (or from subsequent generations of candidate rules), rules for inclusion within a rule set for detecting duplicates within item description information.

30 Claims, 7 Drawing Sheets

| Property Name | Source ASIN B000BZJ89S | Target ASIN B000VASOFC |
|---|---|---|
| | Price: NA | Price: NA |
| | Range: NA | Range: NA |
| item_name | en_US: Bosch 13860 Oxygen Sensor, OE Type Fitment | en_US: Bosch 13860 Oxygen Sensor |
| gtin | 00028851138604 | NA |
| item_package_quantity | 1 | 1 |
| manufacturer | en_US: Bosch | en_US: Bosch |
| brand_name | en_US: Bosch | en_US: Bosch |
| part_number | 13860 | 13860 |
| catalog_number | 13860 | NA |
| product_type | AUTO_PART | AUTO_ACCESSORY |
| us_buy_box_price | 77.54 | 122.72 |
| asin_version | 93 | 31 |
| gl_product_group | gl_automotive | gl_automotive |
| item_classification | BASE_PRODUCT | BASE_PRODUCT |
| item_type_keyword | en_US: automotive-oxygen-sensors | en_US: automotive-accessories |
| marketplace | 1 | 31320, 1, 31200 |
| matching_part_number | 13860 | 13860 |
| part_type_id | 5132 | 5132 |
| physical_image_id | 410SPPY92HL, 31asyjznDL, 41v6m9UEZhL | 41v6m9UEZhL |
| product_description | en_US: Bosch original equipment oxygen sensors are designed for identical OE fit, no cutting or wire splicing is necessary. Bosch invented the first oxygen sensor and has provided best in class performance and maximum service life so that they are the #1 OE and aftermarket sensor. Premium ceramic technology incorporates Zirconium or titania and yttrium provides superior protection against mechanical and thermal | en_US: OE TYPE BEFORE CATALYST |

*FIG. 1*

| 202 | 204 |
|---|---|
| IPQ | Matching_direction: one-way<br>Matching_function: exact<br>Source_attribute: item_package_quantity<br>Target_attrbiute: item_package_quantity<br>Matching_threshold: 1.0<br>Accept_missing: no |
| image_id | NULL |
| part_number | NULL |
| gtin | Matching_direction: symmetric<br>Matching_function: exact<br>Source_attribute: gtin<br>Target_attrbiute: gtin<br>Matching_threshold: 1.0<br>Accept_missing: yes |
| title_1 | Matching_direction: one-way<br>Matching_function: exact<br>Source_attribute: alphabetic_item_name<br>Target_attrbiute: item_name<br>Matching_threshold: 0.95<br>Accept_missing: no |
| title_2 | Matching_direction: symmetric<br>Matching_function: piecsa<br>Source_attribute: item_name<br>Target_attrbiute: item_name_and_product_description<br>Matching_threshold: 0.85<br>Accept_missing: no |

SYSTEM AND METHOD FOR GENETIC CREATION OF A RULE SET FOR DUPLICATE DETECTION

BACKGROUND

Merchants that operate network-accessible marketplaces may maintain electronic catalogs that include thousands of items (or more) offered for sale. These electronic catalogs often include item detail pages accessible through one or more networks (e.g., web pages accessible over the Internet). These item detail pages often include descriptive information (e.g., text descriptions, pictures or video) in order to assist a buyer in determining whether an item is worth purchasing. In many cases, this descriptive information may be based on information from manufacturers or suppliers of the items offered for sale. In some cases, different manufacturers and suppliers may provide the descriptive information to the merchant in different formats. For example, one supplier may list one type of identifier for an item as a part number whereas another supplier of that same item might list that identifier as a model number. In some cases, some suppliers may provide very detailed item information for an item whereas another supplier might provide very basic information. For instance, one supplier might include a text description including comprehensive marketing literature whereas another supplier might omit such description and only include basic information, such as a part or model number. Due at least in part to these types of variations in item information received from different suppliers of the same item, identifying duplicate item information (e.g., two sets of item information that may be different but nevertheless describe the same item) may not be an insignificant task.

BRIEF DESCRIPTION OF THE DRAWINGS

FIG. 1 illustrates an example of item description information, according to some embodiments.

FIG. 2 illustrates an example population individual or duplicate detection rule, according to some embodiments.

Figure 3:
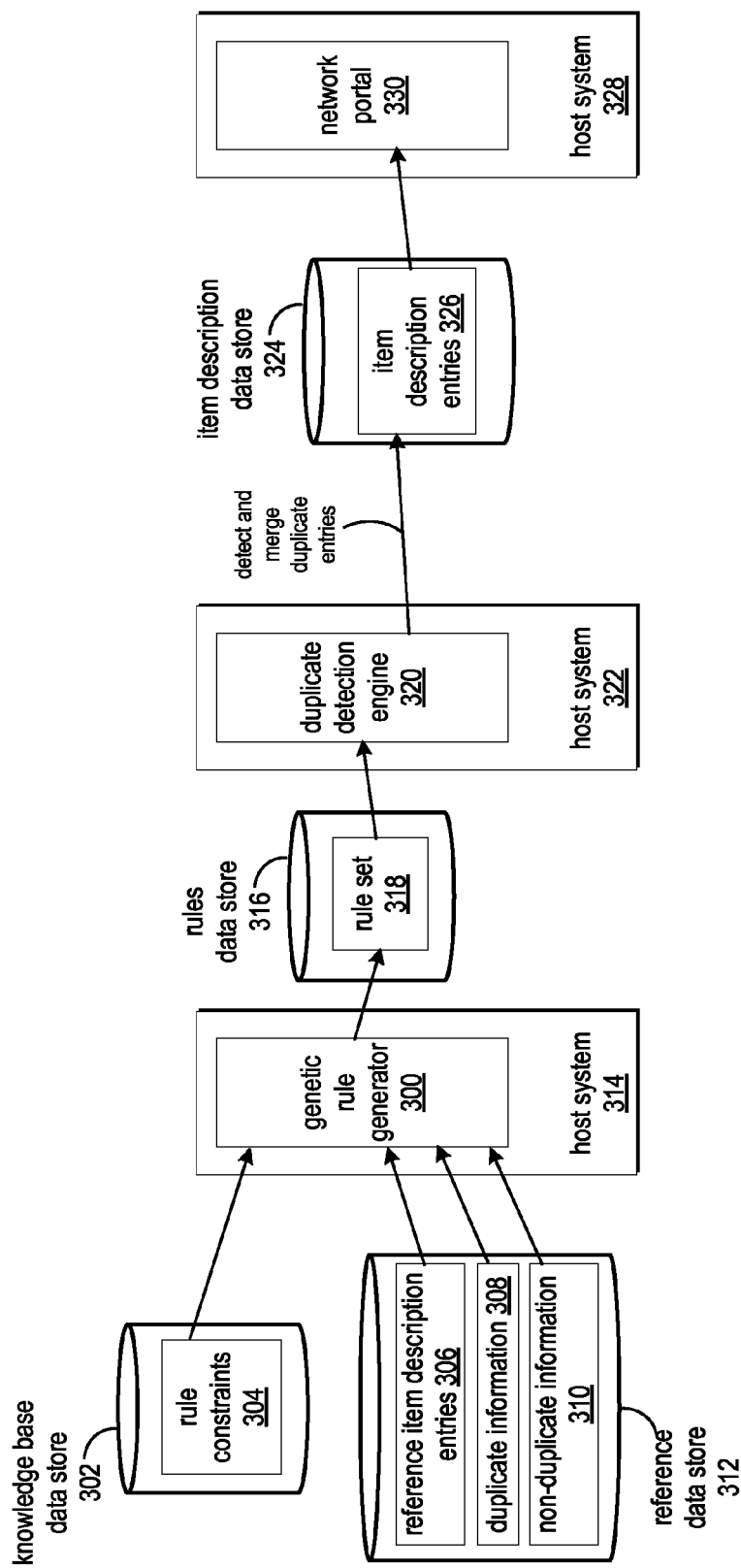
FIG. 3 illustrates a block diagram of the elements of a system and method for genetic creation of a rule set for duplicate detection, according to some embodiments.

While the system and method for genetic creation of a rule set for duplicate detection is described herein by way of example for several embodiments and illustrative drawings, those skilled in the art will recognize that the system and method for genetic creation of a rule set for duplicate detection is not limited to the embodiments or drawings described. It should be understood, that the drawings and detailed description thereto are not intended to limit the system and method for genetic creation of a rule set for duplicate detection to the particular form disclosed, but on the contrary, the intention is to cover all modifications, equivalents and alternatives falling within the spirit and scope of the system and method for genetic creation of a rule set for duplicate detection as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for genetic creation of a rule set for duplicate detection are described. This rule set may be utilized by a duplicate detection engine to detect duplicate item description entries within a data store of item description information. In some cases, duplicate item description entries may vary due to differences in the manner that suppliers (e.g., vendors, manufacturers, etc.) structure item description information. For instance, two different suppliers may provide units of the same item to a merchant. Each supplier may also provide item description information for the item in different formats. FIG. 1 illustrates one example of such information. In the illustrated embodiment, the item description information may include multiple different properties 100 for a particular item, such as various identifiers, characteristics, and descriptions. As illustrated, the item description information for the same item may vary across suppliers. For instance, item description information 102 may be provided by one supplier and item description information 104 may be provided by another supplier; this information may be different even though it pertains to the same item, namely a specific oxygen sensor in the illustrated example. The item description information may differ across suppliers for any of a variety of reasons including but not limited to differences in nomenclature. For example, one supplier may refer to an item identifier as a part number whereas another identifier may refer to that same identifier as a model number. In another example, suppliers may use different terms or phrases to describe the type of product that an item is. In the illustrated example, one supplier refers to the example oxygen sensor as being part of an "auto_part" product type and the other supplier refers to the sensor being part of an "auto_accessory" product type.

In various instances, if these types of differences are not recognized, the merchant or other entity that receives the item description information may interpret the information as pertaining to two different items even in cases where such information does indeed described the same item. For clarity of description, different item description entries that pertain to the same item may be referred to herein as duplicate item description entries or simply "duplicates." In the illustrated example, item description entries 102 and 104 represent duplicates.

The presence of duplicates may have a variety of implications including but not limited to duplicate item detail pages for the same item. For example, a merchant may rely on item description entries to generate item detail pages that are available to customers. For instance, item detail pages could be web pages available through a network-based marketplace and customers could browse such item detail pages from remote client devices equipped with web browsers. In this example, the presence of duplicate item description entries could result in the creation of two or more item detail pages for the same item. In some cases, it may be desirable to avoid this situation as it may provide a less streamlined browsing experience for customers and may discourage price competition among third party sellers. In another example, duplicate item description entries may cause the generation of multiple inventory records for the same item. For instance, if a merchant does not recognize duplicate item description information for a particular item, the merchant might mistakenly generate two or more independent inventory records for the same item. In some cases, such unintended partitioning of inventory records might induce suboptimal merchant operations. For instance, if one of the inventory records for an item indicates that the item is nearly out of stock, the merchant might needlessly order additional stock of the item if the merchant is not immediately aware of other inventory records that indicate a sufficient quantity of that item is held in inventory. By identifying and merging duplicate item description entries, embodiments may prevent the duplicate information from propagating throughout the merchant's systems.

Example Rule

In various embodiments, to reduce or eliminate the presence of duplicate item description entries, merchants (or other entities) may utilize a rule-based duplicate detection system to identify and/or merge such duplicates into single entries. As described in more detail below, the duplicate detection system may include a duplicate detection engine configured to use a rule set to evaluate multiple item description entries and identify and/or merge duplicate entries. In various embodiments, such a rule set may include multiple rules, each of which may include multiple rule conditions. FIG. 2 illustrates one such example rule. In the illustrated embodiment, rule 200 includes multiple rule conditions 202, each of which may include one or more elements 204. For instance, the first rule condition of the illustrated rule pertains to item package quantity or "IPQ." Additionally, the IPQ rule condition includes multiple parameters that generally specify how a portion of one item description entry should be compared to another item description entry for duplicate detection. For the illustrated IPQ rule condition, the condition parameters specify that one-way evaluation of the source attribute and the target attribute is sufficient. In this case, the source attribute is the "item_package_quality" attribute of the first item description entry and the target attribute is the "item_package_quality" attribute of the second item description entry. As illustrated, a rule condition may also designate a particular matching function with which to compare the attributes. Also illustrated, the condition may specify a matching threshold score that should be met in order for the rule condition to be met. In the IPQ rule condition, this threshold score is 1.0. In other words, the "exact" matching function must at a minimum return a score of 1.0 in order for the IPQ rule condition to resolve to true for the pair of item description information entries being evaluated.

In the illustrated embodiment, a number of other rule conditions are illustrated (e.g., "gtin," "title_1" and "title_2"). In some cases, other available rule conditions may not be used for this particular rule. As illustrated, these rule conditions are marked "null" for rule 200. In various embodiments, various other rule conditions for evaluating pairs of item description entries may be utilized. For instance, rule conditions that are not illustrated and/or variations of the illustrated rule conditions may be utilized. Furthermore, while not illustrated in the particular example rule of FIG. 2, the rule conditions of a given rule may be associated by one or more Boolean logic operators (e.g., AND, OR, etc.). For instance, the "AND" Boolean operator may be utilized to specify that in order for one item description entry to be considered a duplicate of another item description entry, all rules conditions of the rule must be met. Rules themselves may also be linked or associated with other rules through similar Boolean logic operators.

As noted above, in various embodiments multiple rules may be aggregated together as part of one or more rule sets, which may be interpreted and utilized by a duplicate detection engine in order to identify and/or merge item description entries. In various embodiments, the rule set(s) may be generated utilizing genetic techniques, as described in more detail below. Generally, when compared to administrator-generated rule sets, the use of genetic techniques may result in faster creation of a given rule and/or a rule set that yields better recall and precision.

Genetic Creation of a Rule Set

Figure 4:
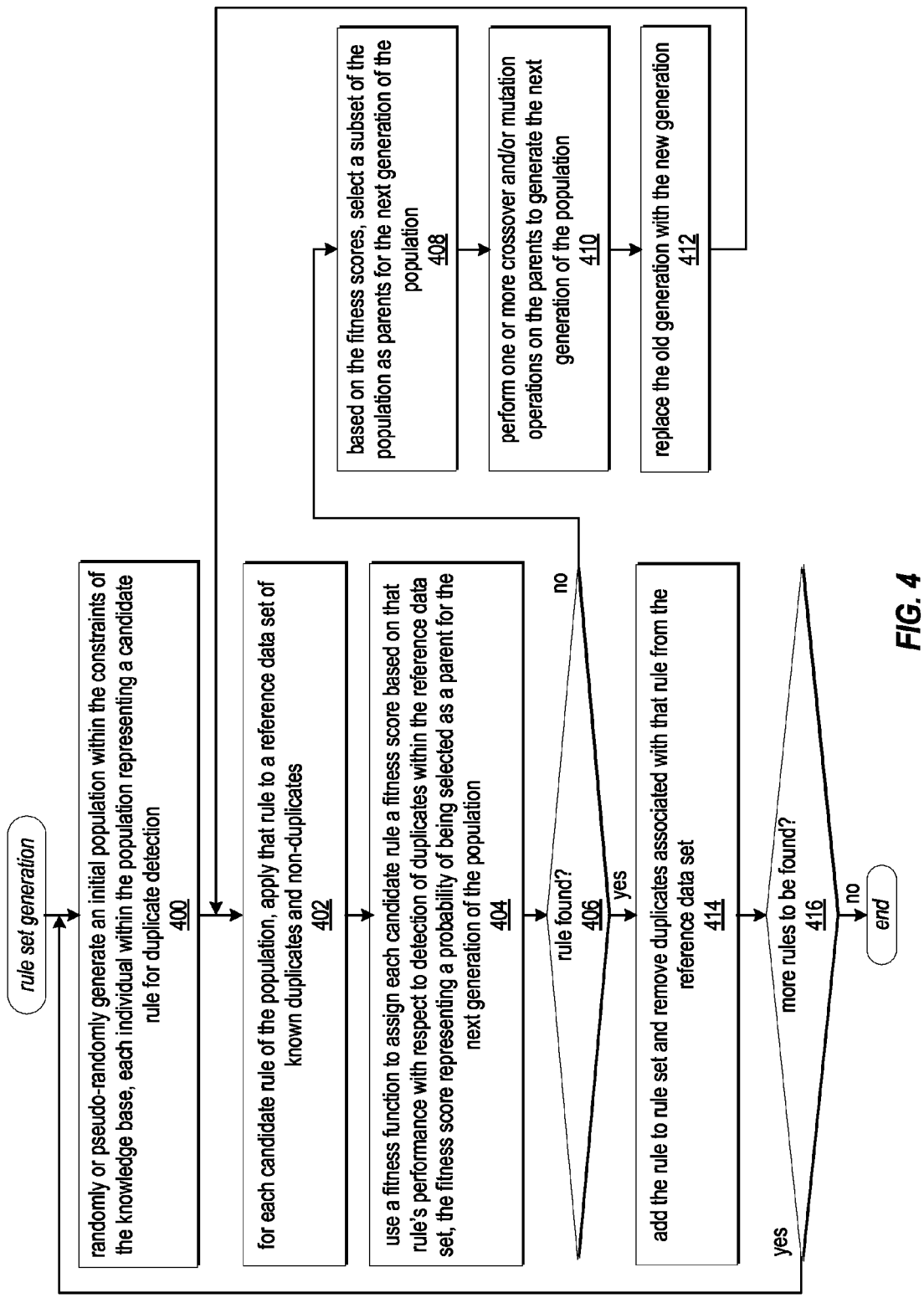
FIG. 4 illustrates a flowchart of an example method for using genetic techniques to generate a rule set for duplicate detection, according to some embodiments.

In various embodiments, the genetic creation of a rule set may be performed by a genetic rule generator component. FIG. 3 illustrates a system configuration including a genetic rule generator, according to some embodiments. In various embodiments, genetic rule generator 300 may be configured to utilize genetic techniques and/or genetic algorithms to generate rule set 318 of rules data store 316. In various embodiments, genetic rule generator 300 may be implemented on a host system 314. In various embodiments, host system 314 may be a computer, such as the computer system of FIG. 7 described below. In various embodiments, genetic rule generator 300 may be configured to generate rule set 318 according to a method for genetic rule creation, such as that of FIG. 4. For clarity of description, FIGS. 3 and 4 are described collectively herein. Furthermore, note that while the method of FIG. 4 is described herein as being performed by genetic rule generator 300, the method need not be performed by any specific component in some cases. For instance, in some cases, the method of FIG. 4 may be performed by some other component or computer system, according to some embodiments. In various embodiments, the method of FIG. 4 may be performed by a computer, such as the computer system of FIG. 7.

As illustrated at block 400, the method may include genetic rule generator 300 randomly or pseudo-randomly generating an initial population of rules within the constraints of a knowledge base. In various embodiments, each individual within the population may be a candidate rule for detecting duplicate item description entries (e.g., different item description entries for the same item). One example of such constraints includes rule constraints 304 of knowledge base data store 302. Generally, rule constraints 304 may include any constraint on the manner in which candidate rules are generated. For instance, in some embodiments, a given constraint may place restrictions on which fields of a pair of item description entries may be compared. This may prevent the genetic rule generator 300 from needlessly wasting computation resources on rules that are likely to provide inferior results. For instance, one example constraint might specify that the "color" field from one item description entry cannot be compared to a "size" field of another item description entry. For example, even though item description information may vary across suppliers, suppliers are unlikely to specify an item's color within a size field and vice versa. However, other variabilities may occur across merchant data. For instance, as described above, one supplier may refer to an item identifier as a part number whereas another identifier may refer to that same identifier as a model number. As described in more detail below, the rules described herein may be genetically adapted or evolved to identify similarities among this type of semi-structured item description information.

Figure 5:
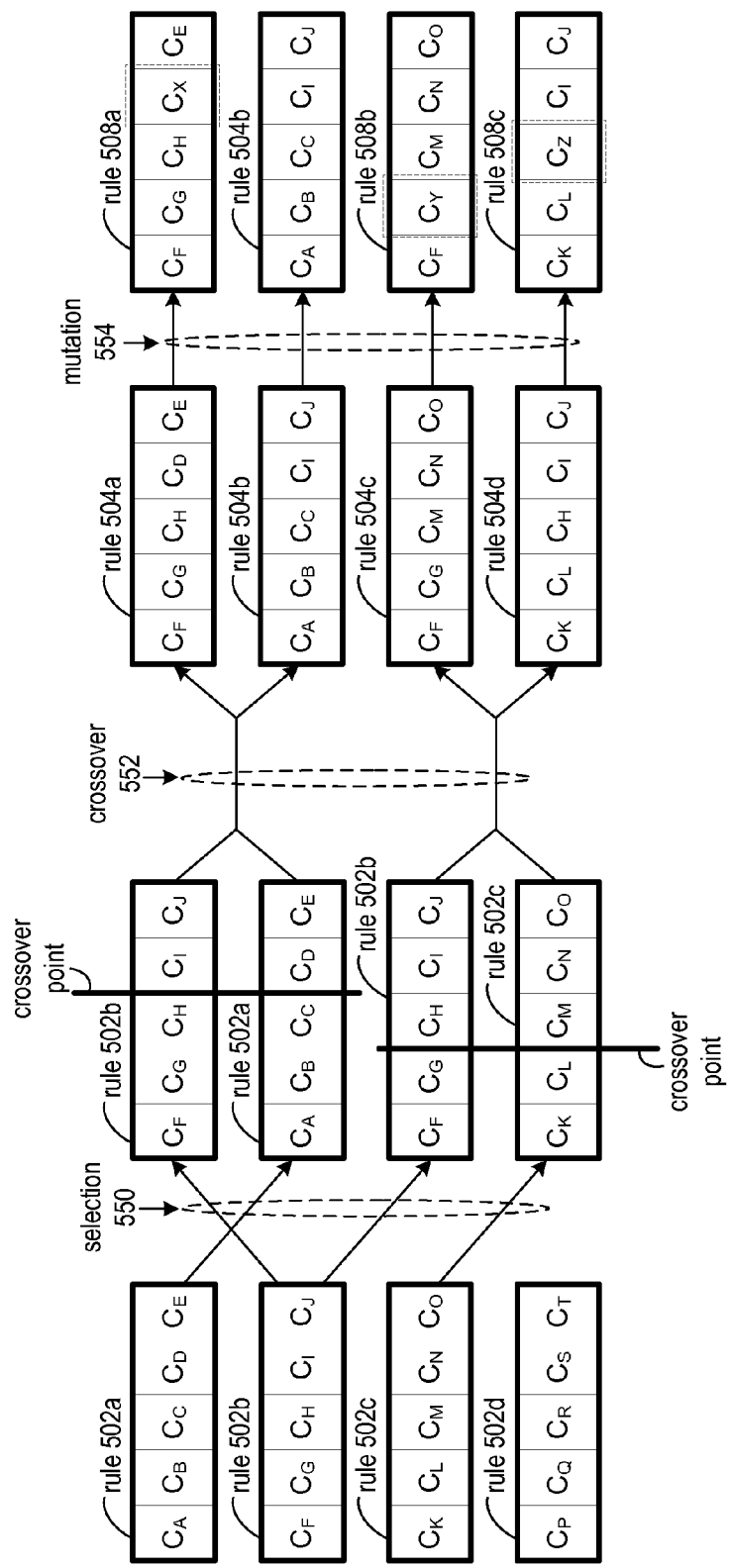
FIG. 5 illustrates a block diagram of performing selection, crossover, and mutation on candidate rules that include multiple different conditions, according to some embodiments.

In various embodiments, to randomly or pseudo-randomly generate a given rule within the initial population, the method may include the genetic rule generator randomly selecting rule conditions from a set of possible rule conditions within the constraints set forth by constraints 304. For instance, example rule conditions are described above with respect to rule conditions 204. In various embodiments, the quantity of rule conditions in a given rule may also be generated randomly or pseudo-randomly. Likewise, relationships (e.g., Boolean relationships) between the rule conditions of a given rule may also be randomly or pseudo-randomly generated in some embodiments. FIG. 5, which is also collectively described herein along with FIGS. 3 and 4, illustrates a non-limiting example initial population of candidate rules 502a-d. In this non-limiting example, the initial population of rules consists of four rules; however, in various embodiments any quantity of rules (e.g., more than four) may be generated as part of the initial population. In the illustrated embodiment of FIG. 5, conditions $C_A$-$C_E$ represent five randomly or pseudo-randomly selected conditions that make up rule 502a. Likewise, conditions $C_F$-$C_J$ represent five randomly or pseudo-randomly selected conditions that make up rule 502b, conditions $C_K$-$C_O$ represent five randomly or pseudo-randomly selected conditions that make up rule 502c, and conditions $C_P$-$C_T$ represent five randomly or pseudo-randomly selected conditions that make up rule 502d. In various embodiments, each rule condition of FIG. 5 may be similar to any of the rule conditions described herein. For instance, rule conditions may be similar to rule conditions 204 of FIG. 2 described above.

As illustrated at block 402, the method may include the genetic rule generator, for each candidate rule of the population, applying that rule to a reference data set of known duplicates and non-duplicates. One example of this reference data set includes reference item description entries 306 of reference data store 310. In various embodiments, duplicate information 308 may indicate which pairs of item description entries (from entries 306) are duplicates (e.g., entries that may be different across one or more fields but nevertheless describe the same item, such as entries 102 and 104 of FIG. 1). In various embodiments, non-duplicate information 310 may indicate which pairs of item description entries (from entries 306) are not duplicates. In various embodiments, the duplicate and non-duplicate information may be determined prior to the genetic analysis. For instance, a system administrator or operator may evaluate reference item description entries 306 to definitely determine which pairs of items are duplicates and not duplicates as well as store such information within reference data store 312. In various embodiments, reference item description entries may be a sample taken from item description entries 326, which may represent a larger group of item description entries. For instance item description entries 326 may represent the item description entries for an entire electronic catalog of items or some portion thereof (e.g., a portion pertaining to a product category, such as automotive or lawn and garden).

As illustrated at block 404, the method may include the genetic rule generator using a fitness function to assign each candidate rule a fitness score based on that rule's performance with respect to detection of duplicates within the reference data set (e.g., within reference item description entries 306). In various embodiments, the fitness score for a given candidate rule may represent that candidate rule's probability of being selected as a parent for the next generation of the population. In this way, candidate rules with relatively large fitness scores will be more likely to become parents and fitness scores with relatively small fitness scores will be less likely to become parents. In various embodiments, the genetic rule generator 300 may determine measures of precision and recall for each candidate rule in the population and generate a corresponding score using a fitness function that is based at least in part on measures of precision and recall. One example fitness function may be $$\text{fitness score} = \text{recall} \times 0.999^{NR} \times 0.9999^{NT} + \beta.$$

In various embodiments, this fitness function may be utilized when the precision of a candidate rule is 100% (or some other configurable threshold). Also note that recall of the fitness score may be a positive value. Furthermore, NR may represent the number of non-null rule conditions. For instance, as the number of non-null rule conditions increases, the fitness score above will decrease. In this example, the larger the quantity of non-null rule conditions, the smaller the probability that the respective rule will be selected as a parent for the next generation of candidate rules. In other words, candidate rules are penalized for having large quantities of non-null rule conditions in some cases. Furthermore, NT may represent the number of tokens (e.g., parsed terms or phrases) within one or more conditions of the candidate rule being evaluated. In this way, candidate rules may be penalized for having verbose rule conditions in some cases (e.g., simpler rules may be favored in some embodiments). In various embodiments, if precision is below 100% (or some other configurable threshold), the fitness score may be set to $\delta$. In this way, candidate rules may be penalized for having poor precision. In some embodiments, $\delta$ may be some small positive value (e.g., 0.02). In this way, in some embodiments, even candidate rules that do not exhibit strong fitness scores have at least some chance of being selected as a parent for the next generation of rules. While the number of rule conditions and the quantity of tokens are provided as examples of factors that influence the fitness scores described herein, the fitness scores may in various embodiments utilize any measure of rule complexity and/or expressiveness to generate a fitness score. Generally, these measures may provide some indication of the computing resources required to evaluate the rules; computationally simple rules may in some embodiments be preferred over more complex rules.

Figure 6:
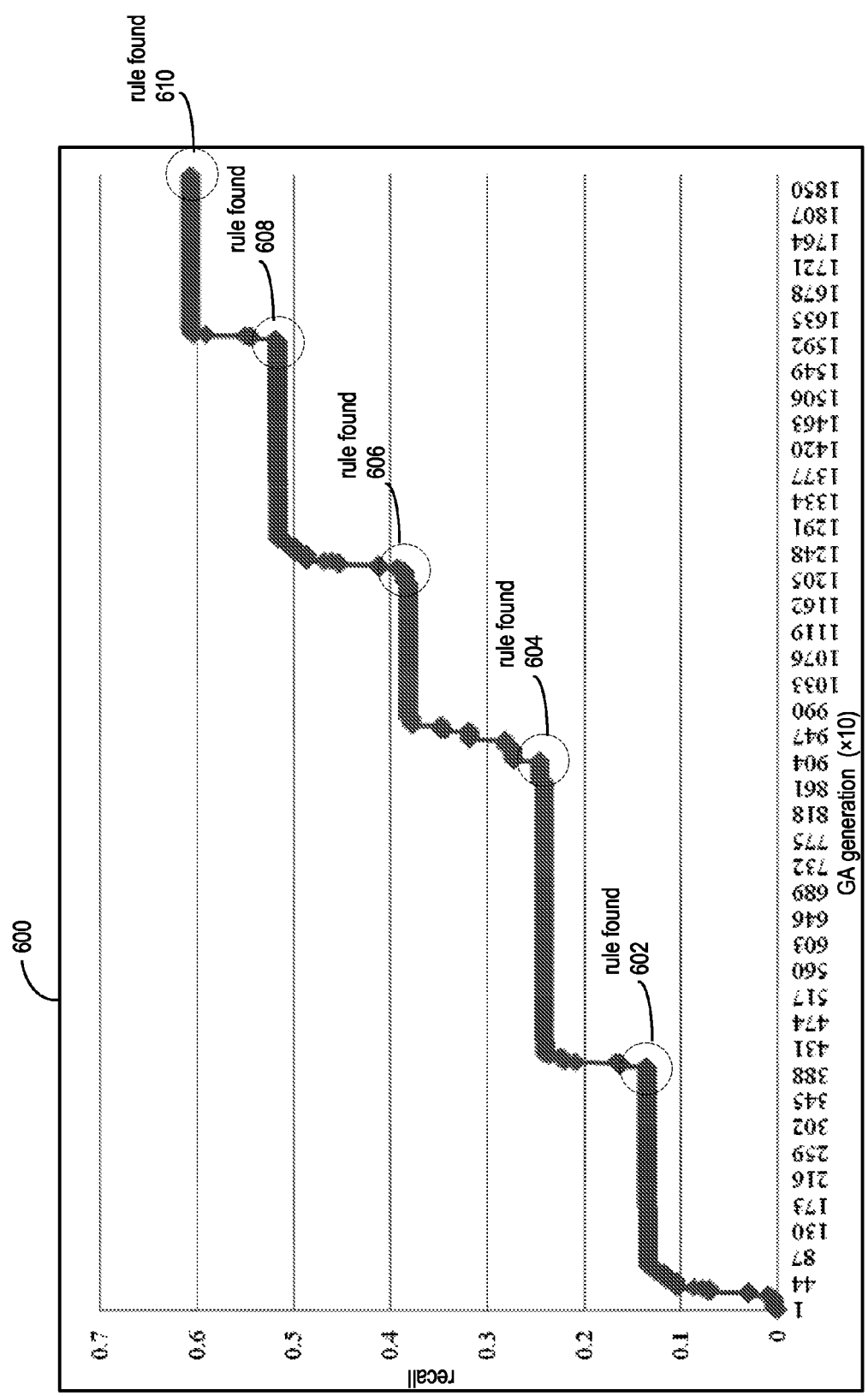
FIG. 6 illustrates of a graphic plot for generating multiple rules for a rule set to be used for duplicate detection, according to some embodiments.

After block 404, the method may proceed to block 406, at which point the genetic rule generator may determine whether a rule has been found. In various embodiments, this may include comparing a measure of recall for the current generation of candidate rules to a measure of recall for the previous generation of candidate rules. (This aspect of the method may be skipped for the initial population.) For instance, in some cases, this measure of recall may include average recall for each candidate rule in the populations. In other cases, this measure of recall may include a measure of recall for the best rule (e.g., the rule with the largest recall) of each population. In various embodiments, if the measure of recall has not improved by a certain quantity relative to the last generation (e.g., has not increased by a configurable percentage) and/or has not increased within a certain number of iterations, the method may include genetic rule generator 300 determining that a rule has been found. For instance, FIG. 6 illustrates the search for multiple different rules that make up a rule set, and the initial discovery of rule may be illustrated at 602. Note that after a certain number of iterations, recall may plateau or level off, at which point the genetic rule generator may determine that a rule has been found at 602. Subsequent to 602, a new initial population of candidate rules may be generated (e.g., in accordance with block 400 of FIG. 4) and another rule may be found at 604 after multiple iterations of blocks 402-412 (described in more detail below). Rules may be found at 606-610 in a similar manner. In cases where the measure of recall is not improving (e.g., has not improved beyond some configurable threshold of recall improvement) at block 406, the genetic rule generator may determine that a rule has been found, and the method may proceed to block 414 (described in more detail below). In cases where the measure of recall is still improving (e.g., improved beyond some configurable threshold of recall improvement) at block 406, the method may proceed to block 408.

As illustrated at block 408, the method may in various embodiments include the genetic rule generator 300 selecting a subset of the population of candidate rules as parents for the next generation of the population based on the fitness scores that were generated for the candidate rules of the initial population. As noted above, the fitness score for a given candidate rule may represent that candidate rule's probability of being selected as a parent for the next generation of the population. Generally, candidate rules with larger fitness scores will be more likely to be selected than candidate rules with relatively smaller fitness scores. In some embodiments, a specific quantity of rules may be selected for inclusion within the subset of parents. In other cases, the subset may be selected such that a particular ratio or percentage of the candidate population is selected as parents. In various embodiments, the candidate rules may be weighted within a selection pool based on their respective fitness scores and the method may include the genetic rule generator randomly or pseudo-randomly selecting candidate rules from such selection pool. In some cases, some other type of probabilistic selection may be performed such that the probability of selecting a given candidate rule to be a parent is proportional to that candidate rule's fitness score. In any case, the selected subset of candidate rules may be designated as parents that are to be used to reproduce the next generation of candidate rules. In the illustrated embodiment, this selection process is illustrated as selection 550. For instance, in the illustrated embodiment of FIG. 5, rule 502d may have a very small fitness score relative to the fitness scores generated for rules 502a-c. In this case, rules 502a-c are probabilistically selected to become parents and rule 502d is eliminated from consideration.

As illustrated at block 410, the method may include the genetic rule generator 300 performing one or more crossover and/or mutation operations on the parents to generate the next generation of the population. For instance, examples of crossover and mutation operations are illustrated as crossover 552 and mutation 554 of FIG. 5. In various embodiments, a mutation operation may include selecting a crossover point for a pair of candidate rules and, on one side of the crossover point, swapping the conditions of each rule. For instance, in the illustrated example, a crossover operation is performed on rule 502a (including conditions $C_A$-$C_E$) and rule 502b (including conditions $C_F$-$C_J$) in order to generate rule 504a (including conditions $C_F$-$C_H$ and $C_D$-$C_E$) and rule 504b (including conditions $C_A$-$C_C$ and $C_I$-$C_J$). A similar crossover may be performed to generate rules 504c and 504d from rules 502b and 502c. As illustrated, the crossover operations may create a new generation of rules that are comprised of the conditions from the previous generation of rules. In various embodiments, before the new generation of candidate rules is finalized, one or mutation operations 554 may also be performed on the conditions of the new generation. In various embodiments, these conditions may be selected randomly or pseudo-randomly. In the illustrated embodiment of FIG. 5, conditions $C_D$, $C_G$, and $C_H$ are randomly selected for mutation. As illustrated, these conditions are mutated (e.g., modified) into new conditions $C_X$, $C_Y$, and $C_Z$. In various embodiments, the mutation operation may include but is not limited to adding a random rule condition, removing a random rule condition, mutating a random element of a random rule condition (e.g., changing a one-way matching requirement to a symmetric matching requirement for an item name comparison), and/or replacing all rule conditions with new random rule conditions. As illustrated in FIG. 5, mutation operation(s) 554 may result in mutated rules 508a-c; rule 504b remains unchanged. In various embodiments the collection of mutated rules 508a-c and rule 504b may make up the new generation of candidate rules.

As illustrated at block 412, the method may include the genetic rule generator replacing the old generation of rules (e.g., rules 502a-d) with the new generation of rules (e.g., rules 508a-c and rule 504b). In various embodiments, this new generation may become the current generation that is evaluated. After block 412, the method may proceed to block 402, at which point another iteration begins for the current population.

As described above, in cases where the measure of recall is not improving (e.g., has not improved beyond some configurable threshold of recall improvement) at block 406, the genetic rule generator may determine that a rule has been found, and the method may proceed to block 414. For instance, as described above, rules may be found at 602-610 when recall plateaus or levels off after some quantity of iterations. In various embodiments, the rule identified by the genetic rule generator may be strongest rule of the population (e.g., the rule with the largest measure of recall). At block 414, the method may further include the genetic rule generator adding the rule to the rule set, such as rule set 318 of FIG. 3. As illustrated, this portion of the method may also include the genetic rule generator removing from the reference data set, the duplicate item description entries that are found with the identified rule. In various embodiments, this may prevent rules that are found during subsequent iterations of the method from overlapping in scope with the current rule.

At block 416, the method may include the genetic rule generator determining whether more rules are to be found. For instance, this may include determining whether overall recall for the generated rule set has leveled off or reached a plateau. If this is not the case the method may proceed to block 400, at which point the genetic rule generator may generator another initial population in order to find a new rule. If the overall recall for the generated rule set has leveled off or reached a plateau, the genetic rule generator may determine that the rule set is complete. For instance, with reference to FIG. 6, the rules found at 602-610 may make up one rule set, an example of which includes rule set 318 of FIG. 3.

Rule-Based Duplicate Detection

In various embodiments, the rule set 318 generated by genetic rule generator 300 may be utilized by a duplicate detection engine 320, which may be implemented on a host system 322. In various embodiments, host system 322 may be a computer, such as the computer system of FIG. 7 described below. While genetic rule generator 300 and duplicate detection engine 320 are illustrated as separate components in FIG. 3, the functionality of these components may be integrated into a common component in some embodiments.

Duplicate detection engine 320 may be configured to apply one or more rules of rule set 318 to detect duplicate item description entries within item description entries 326 of item description data store 324. In various embodiments, duplicate detection engine 320 may also merge duplicate entries into single entries within data store 324. As described above, the presence of duplicates within item description information may have a number of implications. For instance, the presence of duplicate item description entries could result in the creation of two or more item detail pages for the same item.

For example, these item detail pages may be served by a network portal 330 of host system 328 to one or more remote clients. Also described above, in some cases, the presence of duplicates may cause unintended partitioning of inventory records. Embodiments may avoid these situations by detecting and merging duplicate entries as described herein.

As described above, in various embodiments, reference item description entries 306 may be a sample (e.g., a subset) of the larger collection of item description entries 326. As such, the quality of this sample may in various embodiments affect the quality and/or performance of rule set 318. For instance, quality of the sample may refer to the degree to which reference item description entries 306 are representative of the larger collection of item description entries 326. One manner in which this may be determined may include a comparison of the precision and/or recall for the rule set when applied to a test sample of entries from item description entries 326. For instance, this test sample may be randomly selected from item description entries 326 in various embodiments. If the precision and/or recall of the rule set vary by a specified quantity across the test set and the reference set, the reference item description information may be updated to be more representative of item description entries 326. For example, if the rule set yields 100% precision for entries 306 but only 95% precision for the test sample of entries, embodiments may update reference item description entries 306 by adding item description entries causing false positive or negatives into reference item description entries 306. In this way, reference item description entries 306 may be updated over time to ensure that it remains representative of item description entries 326.

Additional Embodiments and Variations

In various embodiments, techniques similar to those described herein for generating duplicate detection rules may be utilized to generate rules for structuring search queries. For instance, search queries may in various embodiments be utilized to search an index of items (e.g., an index of item detail pages) in order to identify a subset of items that are substitution candidates. For example, some items may be recommended as substitutes for other items within an electronic market place. However, for a given item, comparing that item to every other item within an item catalog may be computationally and/or time prohibitive. To accelerate the process, embodiments may perform a search on a search index to identify items that are similar to the given item. Accordingly, the given item and the items of the search results may serve as the starting point for determining substitutes for the given item (as opposed to evaluating every item in a product catalog). In various embodiments, the quality of these search results may depend on the quality of the search query used to search the search index. Along these lines, techniques similar to those described herein for generating duplicate detection rules may be utilized to generate rules for structuring search queries. For instance, a group of candidate rules for creating search queries may be evolved over time to identify definitive rules for creating search queries for subsetting purposes. For instance, a search query for an item name may in some cases yield a better subset or related items than a search for a brand name and part number. In other cases, the search for the brand name and part number may provide better results than the item name. Embodiments may utilize the genetic techniques described herein to generate rules for structuring these types of queries.

In various embodiments, while genetic techniques are largely described herein as being utilized to identify generate a rule set for identifying duplicates within item description information, similar techniques may be utilized to achieve other objectives in various embodiments. In one example, instead of identifying duplicates, the genetic techniques described herein may be utilized to determine items that are similar but not exact duplicates. These types of items may be referred to herein as related items. In various embodiments, knowledge of related items may be utilized to provide item recommendations within an electronic market place, for example. For instance, network portal 330 described above may be configured to provide one or more recommendations to purchase related items that are related to a items in which a customer has shown interest, such as items in the customer's browsing history. In one example, a component or widget for indicating a given item's related items may be included within an item detail page for that given item. In this way, a user may quickly and easily locate related items when viewing item detail pages. In various embodiments, to generate a rule set for identifying related items, rule constraints 304 may be altered if necessary but may remain generally similar to those used for duplicate detection. For instance, one example constraint might specify that the "color" field from one item description entry cannot be compared to a "size" field of another item description entry as such a comparison may not yield useful results for determining relatedness. In various embodiments, to generate a rule set for identifying related items, reference item description entries 306 duplicate information 308, and non-duplicate information 310 may be updated for detected related items. For instance, instead of indicating duplicates, information 308 may instead specify pairs of item description entries that have been positively identified as related. Likewise, instead of indicating non-duplicates, information 310 may instead specify pairs of item description entries that have been positively identified as not related. In various embodiments, genetic rule generator 300 may utilize genetic techniques similar to those described above in order to evaluate this information to generate a rule set for identifying related items.

In various embodiments, similar techniques may be utilized to adapt the genetic rule generator for generating a rule set for identifying items that are not related. For instance, the inputs to the genetic rule generator may be inverted in order to create a rule set for identifying the absence of items within a product catalog, such as item description entries 326. In various embodiments, the rules may be utilized to create a tool for evaluating whether a given item is related to any items within the product catalog. Such a tool may, for example, be utilized by a merchant's buyer's agents to, before sourcing a given item to be added to the product catalog, ensure that items related to the given item are not already included within the product catalog. For instance, as merchants may not have unlimited resources to stock all items from all vendors or manufacturers, merchants may use such a tool to efficiently utilize existing resources to provide as diverse of a product offering as possible.

Example Computer System

Various embodiments of the system and method for genetic creation of a rule set for duplicate detection, as described herein, may be executed on one or more computer systems, which may interact with various other devices. Note that any component, action, or functionality described above with respect to FIGS. 1-6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 may be configured to implement any functionality of the genetic rule generator 300 described above. Additionally, data 732 of memory 720 may store any of the information or data structures described above, including but not limited to feature rule constraints 304, reference item description entries 306, duplicate information 308, non-duplicate information 310, and/or rule set 318. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 7:
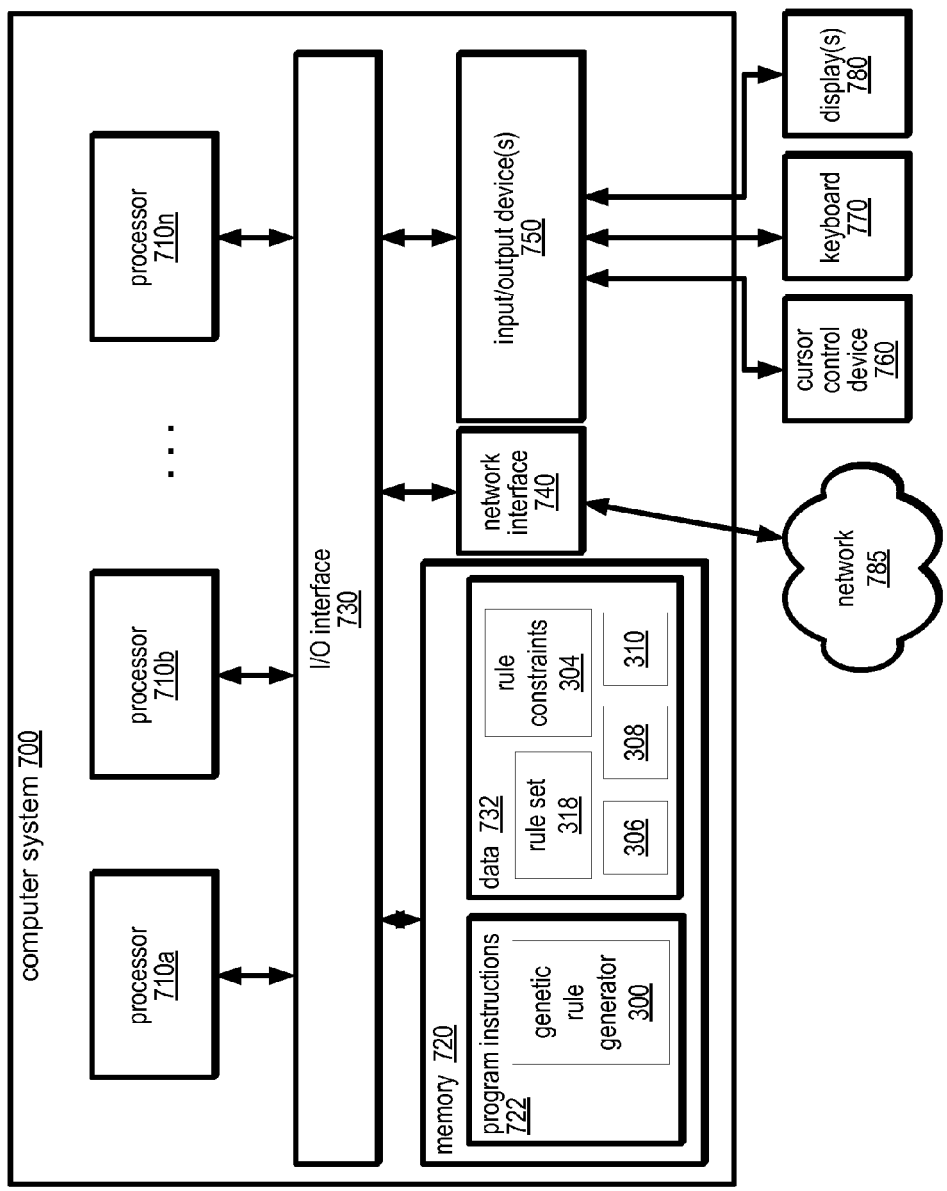
FIG. 7 illustrates one example of a computer system suitable for implementing various elements of the system and method for genetic creation of a rule set for duplicate detection, according to some embodiments.

As shown in FIG. 7, memory 720 may include program instructions 722, which may be processor-executable to implement any element or action described above. In one embodiment, the program instructions may implement the methods described above, such as the methods illustrated by FIG. 4. In other embodiments, different elements and data may be included. Note that data 732 may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
generating a population of candidate rules for detecting duplicates, each duplicate representing different sets of item description information that describe a common item, wherein each candidate rule comprises multiple independent rule conditions and one or more elements for each independent rule condition specifying how a portion of one set of item description information should be compared to another set of item description information for duplicate detection;
for each candidate rule of the population, applying that rule to a reference data set including known duplicates and non-duplicates in order to determine measures of precision and recall for that candidate rule;
assigning each candidate rule a fitness score generated with a fitness function based on the measures of precision and recall determined for that candidate rule, wherein the fitness score of a given candidate rule is representative of that candidate rule's probability of being selected as a parent for a new generation of candidate rules;
based on the fitness scores, selecting a subset of the population of candidate rules as parents for the new generation of candidate rules;
performing one or more operations on the parent candidate rules to generate the new generation of candidate rules, said operations including one or more of: a crossover operation for generating a new candidate rule including different rule conditions from two different parent candidate rules, and a mutation operation for randomly or pseudo-randomly modifying a rule condition passed from a parent candidate rule to a candidate rule of the new generation, wherein modifying a rule condition comprises changing one or more elements of the rule condition; and
selecting from the new generation of candidate rules or one or more subsequent generations of candidate rules, one or more rules for inclusion within a rule set for detecting duplicates within item description information.

2. The method of claim 1, further comprising utilizing the rule set including the one or more selected rules in order to identify duplicate sets of item description information that describe a common item.

3. The method of claim 2, wherein the method further comprises merging the duplicate sets of item description information together to generate a single combined set of item description for the common item.

4. The method of claim 1, wherein the method comprises generating said one or more subsequent generations, wherein said generating comprises repeating said applying, said assigning, said selecting a subset, and said performing in order to generate the one or more subsequent generations.

5. A computer-implemented method, comprising:
generating a population of candidate rules for detecting duplicates, each duplicate representing different item description information entries that describe a common item, wherein each candidate rule comprises one or more independent rule conditions and one or more elements for each independent rule condition specifying how a portion of one set of item description information should be compared to another set of item description information for duplicate detection;
for each candidate rule of the population, applying that rule to a reference data set including known duplicates and non-duplicates in order to determine a measure of that candidate rule's performance with respect to detecting duplicates;
assigning each candidate rule a fitness score based on the respective performance measurement for that candidate rule, wherein the fitness score of a given candidate rule is representative of that candidate rule's probability of being selected as a parent for a new generation of candidate rules;
based on the fitness scores, selecting a subset of the population of candidate rules as parents for the new generation of candidate rules;
changing one or more elements of one or more rule conditions of one or more of the parent candidate rules to generate the new generation of candidate rules; and
selecting from the new generation of candidate rules or one or more subsequent generations of candidate rules, one or more rules for inclusion within a rule set for detecting duplicates within item description information.

6. The method of claim 5, wherein to generate the new generation of candidate rules, the method further includes performing one or more mutation operations on rule conditions passed from parent candidate rules to candidate rules of the new generation.

7. The method of claim 5, wherein for each candidate rule of the population, determining the measure of that candidate rule's performance comprises applying that rule to the reference data set including known duplicates and non-duplicates in order to determine measures of precision and recall for that candidate rule.

8. The method of claim 7, wherein assigning each candidate rule a fitness score comprises determining the fitness score with a fitness function based on the measures of precision and recall for that candidate rule.

9. The method of claim 8, wherein the fitness function is further based on one or more of: a quantity of rule conditions within the respective candidate rule, or a quantity of tokens within said rule conditions.

10. The method of claim 8, wherein the fitness function is structured such that each candidate rule will be assigned a minimum positive score such that the each candidate rule has at least some probability of being selected as a parent.

11. The method of claim 5, further comprising utilizing the rule set including the one or more selected rules in order to identify duplicate sets of item description information that describe a common item.

12. The method of claim 11, wherein the method further comprises merging the duplicate sets of item description information together to generate a single combined set of item description for the common item.

13. The method of claim 5, wherein the method comprises generating said one or more subsequent generations, wherein said generating comprises repeating said applying, said assigning, said selecting a subset, and said performing in order to generate the one or more subsequent generations.

14. A system, comprising:
a memory; and
one or more processors coupled to the memory, wherein the memory comprises program instructions executable by the one or more processors to implement a genetic rule generator configured to:
generate a population of candidate rules for detecting duplicates, each duplicate representing different item description information entries that describe a common item, wherein each candidate rule comprises one or more independent rule conditions and one or more elements for each independent rule condition specifying how a portion of one set of item description information should be compared to another set of item description information for duplicate detection;
for each candidate rule of the population, apply that rule to a reference data set including known duplicates and non-duplicates in order to determine a measure of that candidate rule's performance with respect to detecting duplicates;
assign each candidate rule a fitness score based on the respective performance measurement for that candidate rule, wherein the fitness score of a given candidate rule is representative of that candidate rule's probability of being selected as a parent for a new generation of candidate rules;
based on the fitness scores, select a subset of the population of candidate rules as parents for the new generation of candidate rules;
change one or more elements of one or more rule conditions of one or more of the parent candidate rules to generate the new generation of candidate rules; and
select from the new generation of candidate rules or one or more subsequent generations of candidate rules, one or more rules for inclusion within a rule set for detecting duplicates within item description information.

15. The system of claim 14, wherein to generate the new generation of candidate rules, the genetic rule generator is configured to perform one or more mutation operations on rule conditions passed from parent candidate rules to candidate rules of the new generation.

16. The system of claim 14, wherein for each candidate rule of the population, the genetic rule generator is configured to determine the measure of that candidate rule's performance by applying that rule to the reference data set including known duplicates and non-duplicates in order to determine measures of precision and recall for that candidate rule.

17. The system of claim 16, wherein to assign each candidate rule a fitness score the genetic rule generator is configured to determine the fitness score with a fitness function that is based on the measures of precision and recall for that candidate rule.

18. The system of claim 17, wherein the fitness function is further based on one or more of: a quantity of rule conditions within the respective candidate rule, or a quantity of tokens within said rule conditions.

19. The system of claim 17, wherein the fitness function is structured such that each candidate rule will be assigned a minimum positive score such that the each candidate rule has at least some probability of being selected as a parent.

20. The system of claim 14, wherein the genetic rule generator is configured to utilize the rule set including the one or more selected rules in order to identify duplicate sets of item description information that describe a common item.

21. The system of claim 20, wherein the genetic rule generator is configured to merge the duplicate sets of item description information together to generate a single combined set of item description for the common item.

22. The system of claim 14, wherein the genetic rule generator is configured to generate said one or more subsequent generations, wherein said generating comprises repeating said applying, said assigning, said selecting a subset, and said performing in order to generate the one or more subsequent generations.

23. A non-transitory computer-readable storage medium, storing program instructions computer-executable on a computer to implement a genetic rule generator configured to:
generate a population of candidate rules for detecting duplicates, each duplicate representing different item description information entries that describe a common item, wherein each candidate rule comprises one or more independent rule conditions and one or more elements for each independent rule condition specifying how a portion of one set of item description information should be compared to another set of item description information for duplicate detection;
for each candidate rule of the population, apply that rule to a reference data set including known duplicates and non-duplicates in order to determine a measure of that candidate rule's performance with respect to detecting duplicates;
assign each candidate rule a fitness score based on the respective performance measurement for that candidate rule, wherein the fitness score of a given candidate rule is representative of that candidate rule's probability of being selected as a parent for a new generation of candidate rules;
based on the fitness scores, select a subset of the population of candidate rules as parents for the new generation of candidate rules;
change one or more elements of one or more rule conditions of one or more of the parent candidate rules to generate the new generation of candidate rules; and
select from the new generation of candidate rules or one or more subsequent generations of candidate rules, one or more rules for inclusion within a rule set for detecting duplicates within item description information.

24. The non-transitory computer-readable storage medium of claim 23, wherein to generate the new generation of candidate rules, the genetic rule generator is configured to perform one or more mutation operations on rule conditions passed from parent candidate rules to candidate rules of the new generation.

25. The non-transitory computer-readable storage medium of claim 23, wherein for each candidate rule of the population, the genetic rule generator is configured to determine the measure of that candidate rule's performance by applying that rule to the reference data set including known duplicates and non-duplicates in order to determine measures of precision and recall for that candidate rule.

26. The non-transitory computer-readable storage medium of claim 25, wherein to assign each candidate rule a fitness score the genetic rule generator is configured to determine the fitness score with a fitness function that is based on the measures of precision and recall for that candidate rule.

27. The non-transitory computer-readable storage medium of claim 26, wherein the fitness function is further based on one or more of: a quantity of rule conditions within the respective candidate rule, or a quantity of tokens within said rule conditions.

28. The non-transitory computer-readable storage medium of claim 26, wherein the fitness function is structured such that each candidate rule will be assigned a minimum positive score such that the each candidate rule has at least some probability of being selected as a parent.

29. The non-transitory computer-readable storage medium of claim 23, wherein the genetic rule generator is configured to utilize the rule set including the one or more selected rules in order to identify duplicate sets of item description information that describe a common item.

30. The non-transitory computer-readable storage medium of claim 29, wherein the genetic rule generator is configured to merge the duplicate sets of item description information together to generate a single combined set of item description for the common item.

* * * * *